United States Patent [19]
Wilhelm et al.

[11] 3,719,198
[45] March 6, 1973

[54] PRESSURE INDICATOR FOR PNEUMATIC TIRE

[76] Inventors: Arthur L. Wilhelm, 11375 Fourteen Mile Road, Sterling Heights, Mich. 48077; Leonard M. Wilhelm, 6700 Bloomfield Lane, Birmingham, Mich. 48010; Lawrence L. Wilhelm, 15138 Adams Drive, Warren, Mich. 48093

[22] Filed: Jan. 11, 1971

[21] Appl. No.: 105,415

[52] U.S. Cl.................................137/228, 73/146.8
[51] Int. Cl..............................................F16k 37/00
[58] Field of Search........73/146.4, 146.3, 146.8, 419; 137/227, 228

[56] References Cited

UNITED STATES PATENTS

| | | | |
|---|---|---|---|
| 1,086,296 | 2/1914 | Howe | 137/227 |
| 1,806,380 | 5/1931 | Arnold | 73/146.3 X |
| 2,334,095 | 11/1943 | Hoghaug | 73/419 X |

*Primary Examiner*—Donald O. Woodiel
*Attorney*—Barnes, Kisselle, Raisch & Choate

[57] ABSTRACT

An air pressure indicator device for permanent installation on a pneumatic tire. The device has a main housing with a cylindrical chamber and a piston with associated seals slideably received therein. Air under pressure in the tire acts on and displaces the piston against the bias of a calibrated spring to provide an indication of air pressure. At opposite ends of its stroke the piston engages seals to prevent an over inflated or under inflated tire from being deflated by failure of seals associated with the piston. In one modification of this pressure indicator a stem is also included for inflating the tire.

4 Claims, 10 Drawing Figures

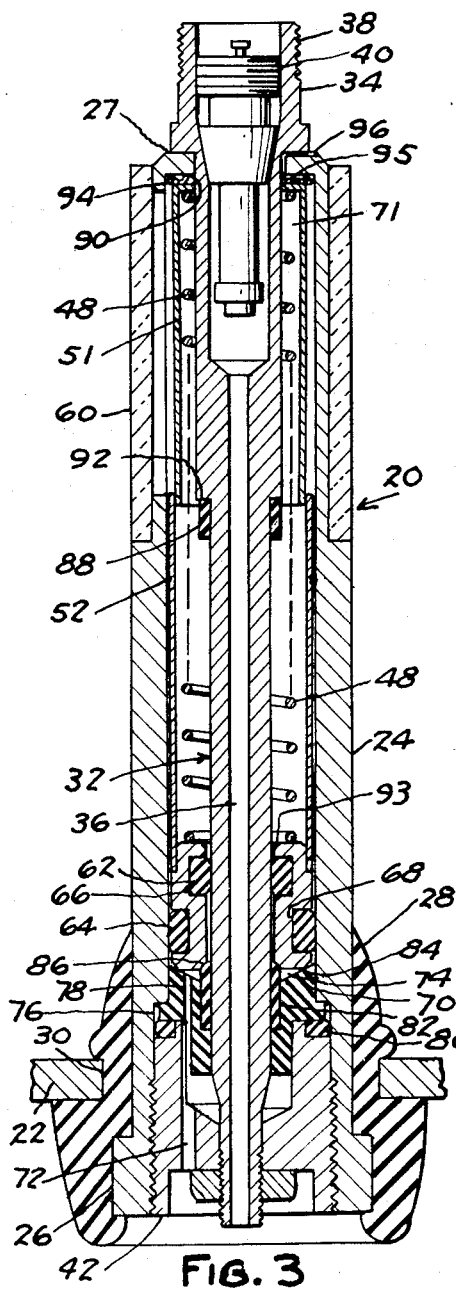
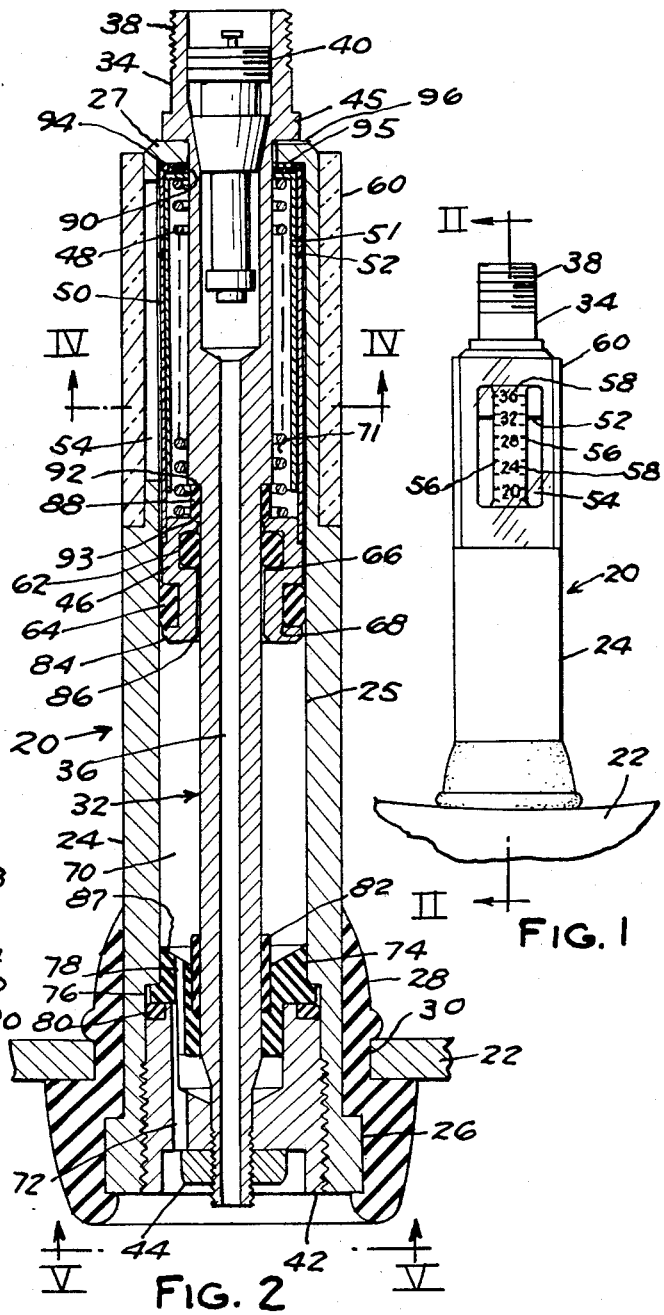
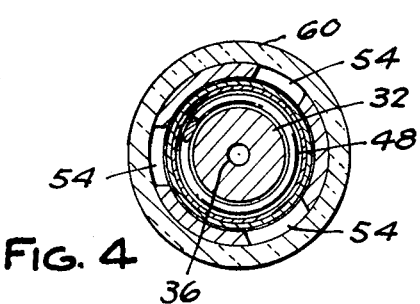

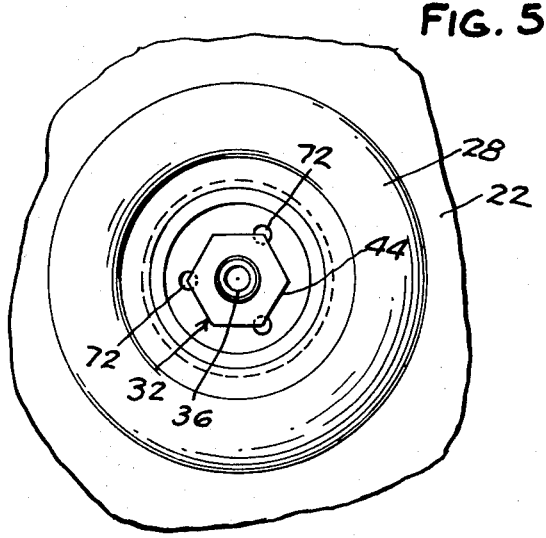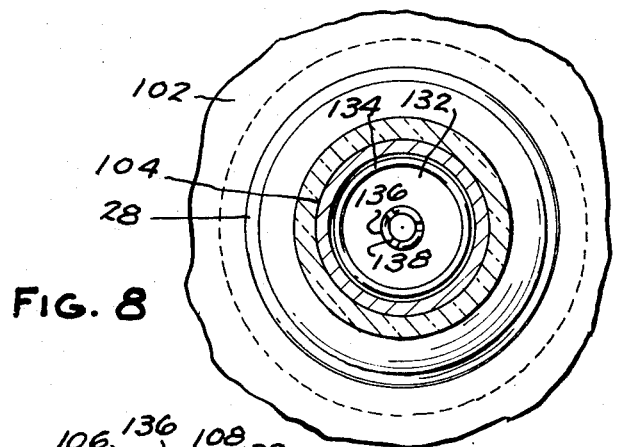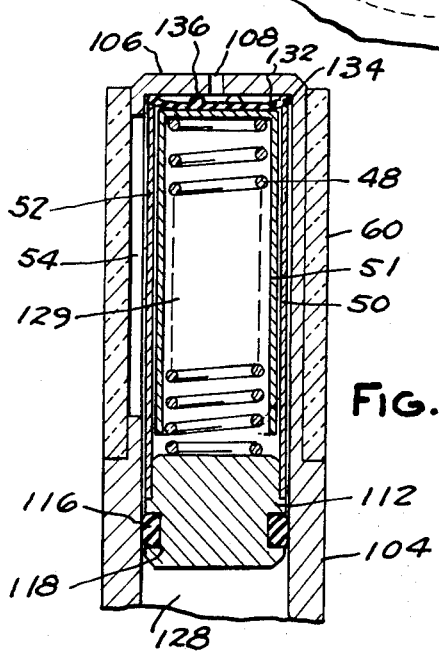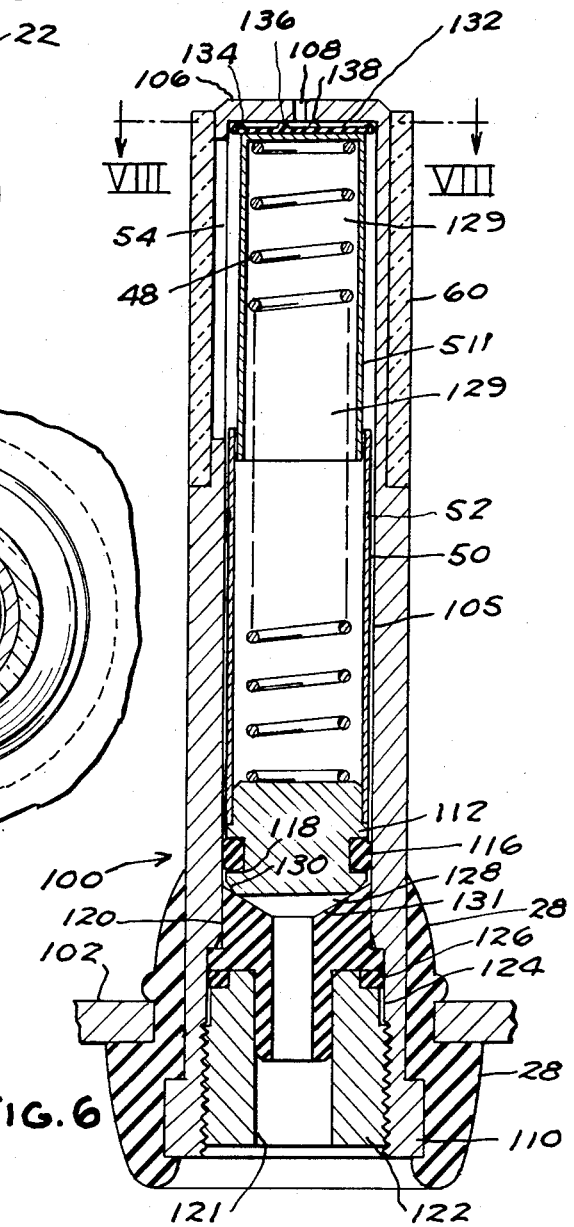

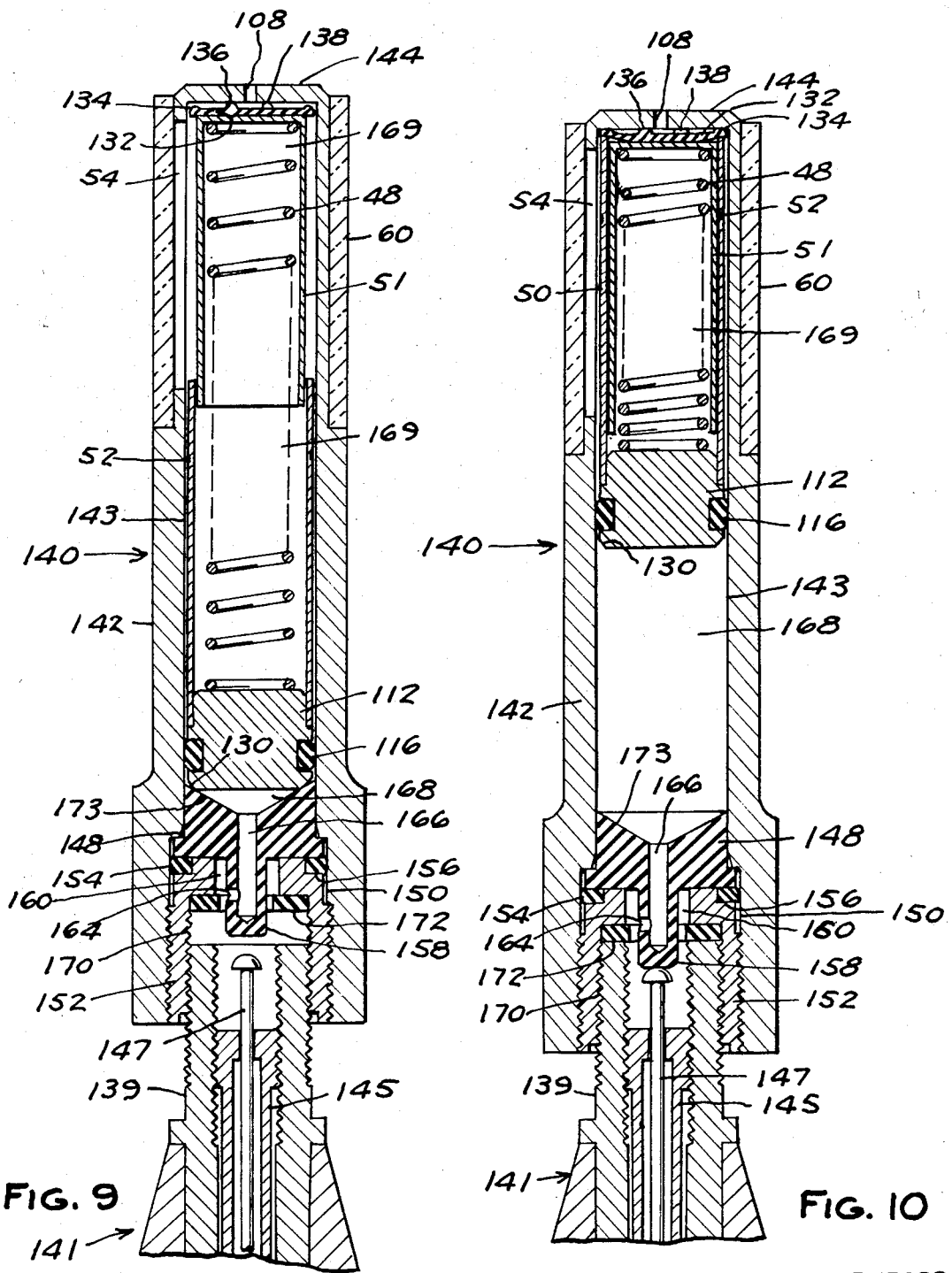

PRESSURE INDICATOR FOR PNEUMATIC TIRE

This invention relates to pressure indicators and more particularly to an indicator for pressure vessels such as pneumatic tires.

Objects of this invention are to provide a pressure indicator for pneumatic tires which automatically seals itself against leaks or seepage in the event of over inflation or under inflation of its associated tire and to provide such a device of economical construction and construction and assembly which is relatively service and maintenance free.

These and other objects, features and advantages of this invention will be apparent from the following description and drawings in which:

FIG. 1 is a side elevational view of a pressure indicator constructed in accordance with this invention mounted on the rim of a wheel.

FIG. 2 is a sectional view on line II—II of FIG. 1 with the component parts of the indicator shown in the position they assume when the tire is over inflated.

FIG. 3 is a sectional view similar to FIG. 2 showing the component parts of the indicator in the position they assume when the tire is under inflated.

FIG. 4 is a sectional view on line IV—IV of FIG. 2.

FIG. 5 is a fragmentary end elevational view on line V—V of FIG. 2.

FIG. 6 is a vertical sectional view of a modified form of construction of the indicator with the parts shown in the position they assume when the tire is under inflated.

FIG. 7 is a fragmentary sectional view similar to FIG. 6 with the component parts of the indicator shown in the position they assume when the tire is over inflated.

FIG. 8 is a sectional view on line VIII—VIII of FIG. 6.

FIG. 9 is a vertical sectional view of another form of the indicator with the component parts shown in the position they assume when the indicator is only partially threaded on a tire valve stem.

FIG. 10 is a vertical sectional view of the indicator shown in FIG. 9 with the parts of the indicator shown in the position they assume when the tire is over inflated.

As shown in FIGS. 1, 2 and 3, a pneumatic tire pressure indicator designated generally 20 is mounted on a rim 22 of a wheel for a pneumatic tire (not shown). Indicator 20 has a generally tubular main housing 24 with a cylindrical chamber 25 and a centrally apertured top wall 27. At its lower end housing 24 is formed with a flange 26 which is sealed within a hole 30 in rim 22 by a rubber adapter bushing 28. A stem 32 with an enlarged hollow head portion 34 connected to an air passageway 36 extends axially through housing 24. At its lower end passageway 36 communicates with the tire chamber. Head 34 has an external configuration adapted for use with conventional apparatus for inflating pneumatic tires and external threads 38 to accept a valve cap (not shown). A conventional pneumatic tire valve core 40 is mounted in head 34 to provide a check valve for controlling the flow of air in passage 36. Stem 32 extends through an adapter plug 42 threaded in a counterbore 76 in the lower end of housing 20. Stem 32 is secured in housing 20 by a nut 44 at the lower end of the stem which bears against the underside of plug 42 to urge a shoulder 45 on head 34 into firm engagement with end wall 27 of housing 20.

A piston 46 is mounted for sliding movement on the central portion of stem 32 and is biased downwardly toward adapter plug 42 by a spring 48. Piston 42 divides chamber 25 into a lower pressure chamber 70 and an upper static chamber 71. The size of each of these chambers varies in accordance with the position of the piston in chamber 25. A visual indication of the position of piston 46 in housing 20 and thus the air pressure within the pneumatic tire is provided by an indicator sleeve 50 having a sealed connection at its lower end to piston 46. Sleeve 50 has an indicator line 52 scribed around the upper end thereof (FIG. 1). Indicator sleeve 50 is telescopingly received on a spring retainer tube 51. Indicator line 52 can be viewed through three axially elongated slots 54 (FIGS. 1 and 4) peripherally spaced about the upper portion of housing 20. A plurality of graduations 56 and numerals 58 on housing 24 between slots 54 cooperate with indicator line 52 to provide a visual indication of the pressure of the air in the tire. A sleeve 60 of a transparent material such as plastic is pressure sealed around the upper portion of housing 20. Sleeve 60 overlies graduations 56, numerals 58 and indicator line 52 to render the indication of tire pressure more readily readable. Graduations 56 and numerals 58 are correlated with the compression rate of spring 48 to provide a proper indication in pounds per square inch of the pressure within the pneumatic tire on which device 20 is used. By varying the mean force and compression rate of spring 48 and coordinating graduations 56 and numerals 58 indicator device 20 can be calibrated for or adapted to a wide range of normal tire pressures.

An airtight seal between piston 46 and both bore 25 and stem 32 is provided by 0-rings 62 and 64 in grooves 66 and 68 in piston 46. Three passageways 72 in plug 42 allow air from the tire on which indicator 20 is used to enter into pressure chamber 70 at the underside of piston 46. A lower rubber seal 74 is located in the lower end of cylindrical chamber 25 and retained in counterbore 76 by adapter plug 42. Seal 74 has three passageways 78 coaxially aligned with passageways 72. An 0-ring 80 in the upper face of plug 42 cooperates with seal 74 to provide an airtight seal between plug 42 and housing 24. A rubber bushing 82 forms a seal between stem 32 and seal 74. As shown in FIG. 3, when piston 46 is fully retracted or urged fully downwardly by spring 48, chamfered edges 84 and 86 of the piston firmly engage the conical surface 87 of seal 74 and the upper end of seal 82, respectively, to provide an airtight seal between piston 46 and both stem 32 and cylindrical chamber 25 of housing 24. Conical surface 87 is inclined at a different angle than chamfered edge 84 so as to assist in obtaining a positive seal.

As shown in FIG. 2, when piston 46 is fully extended or fully displaced upwardly against the bias of spring 48, seal 88 and valve 90 prevent air from escaping from static chamber 71 at the top side of piston 42 through vent passages 96 in end wall 27. Seal 88 is a rubber bushing bearing on a shoulder 92 on stem 32 and adapted to be engaged by a chamfered edge 93 at the upper end of piston 46 to provide an airtight seal therebetween. Valve 90 is a thin rubber disc with a continuous integral bead 94 around the outer periphery of its upper face which in the unstressed condition (as shown in FIG. 3) is spaced from end wall 27 of housing 24. On its upper face the central thickened portion of valve 90 has three radial grooves 95 (FIG. 2), each registering with a vent passage 96 in end wall 27 to provide an exhaust vent for any air entrapped in static air chamber 71 between piston 46 and the upper end of housing 24. The inner peripheral portion of valve 90 is compressed against end wall 27 by spring 48 and the end wall of retainer 51. As shown in FIG. 2, when piston 46 is fully extended the upper end of sleeve 50 firmly engages and flexes the outer peripheral portion of valve 90 to urge bead 94 into sealing engagement with end wall 27 to prevent any air from escaping through grooves 95 and vent passages 96.

In use, the pneumatic tire is inflated by forcing air under pressure through head 34, valve core 40, and passageway 36 of stem 32 into the tire. The air within the tire flows through passages 72 of adapter 42 and aligned passages 78 in lower seal 74 into pressure chamber 70 to act on the lower face of piston 46. When the pressure of the air in the tire reaches the lowest pressure of a predetermined normal range, piston 46 will be partially extended or displaced upward against the bias of spring 48. As the piston moves upward air will be exhausted from static chamber 71 through vent passages 96. This movement of piston 46 will shift indicator sleeve 50 upward and move indicator line 52 so that it can be viewed through slots 54 to indicate by graduations 55 and numerals 58 the pressure of the air within the tire. If the tire becomes over inflated so that its air pressure exceeds the highest pressure of the predetermined range, piston 46 will be fully extended against the bias of its spring 48 thereby shifting the upper end of sleeve 50 into engagement with valve 90 (as shown in FIG. 2). This engagement of sleeve 50 flexes valve 90 and urges bead 94 into sealing engagement with end wall 27 of housing 24. At the same time the upper face of piston 46 seals with bushing 88. Thus, air within the housing is prevented from escaping through grooves 95 and vent passages 96. Thus when the tire is over inflated valve 90 and bushing 88 prevent the pneumatic tire from being deflated by a failure of seals 62 and 64 on piston 46. Over inflation of the tire may be desired to accommodate for an intentional overloading of the vehicle. If due to the failure of seals 64,66 or otherwise the pneumatic tire should become under inflated so that its air pressure drops to a value less than the lowest pressure of the predetermined range, spring 48 urges piston 46 into firm engagement with seals 74 and 82. Engagement of piston 46 with seals 74 and 82 prevents further deflation of the tire by the escape of air through passages 72 and 78, around piston 46 and out through vent passages 96.

FIGS. 6, 7 and 8 illustrate a modified form of indicator 100 mounted on a rim 102 of a wheel which has a separate conventional valve assembly for inflating the tire (not shown). Indicator 100 has a main housing 104 with a bore 105 closed at its upper end by an integral wall 106 having a vent passage 108 therein. A flange 110 adjacent the lower end of housing 104 is received in rim adapter bushing 28 which mounts and airtightly seals housing 104 on rim 102. Indicator 100 includes calibrated spring 48, indicator sleeve 50, indicator line 52, elongated slots 54, graduations 56, numerals 58 and transparent sleeve 60 identical to indicator 20. An airtight seal between a piston 112 to which indicator sleeve 50 is fixed and internal bore 105 of housing 104 is provided by an 0-ring 116 in a groove 118 in piston 112. A lower seal 120 is received in the lower end of bore 105 and in a bore 121 in retainer 122 threaded in a counterbore 124. An O-ring 126 in the upper face of retainer 122 bears on both seal 120 and counterbore 124 to provide an airtight seal between the plug and counterbore. Seal 120 has an axial passage 126 allowing air from a pneumatic tire to enter a variable volume pressure chamber 128 and act on the lower face of piston 112. When piston 112 is in the fully retracted position shown in FIG. 6, a chamfered edge 130 engages the conical surface 131 on sealing member 120 to provide an airtight seal to prevent air from passing from chamber 128 around piston 112 and out through vent 108.

Air entrapped above piston 112 in static chamber 129 flows through vent 108 as controlled by a valve 132. Valve 132 is a generally flat circular rubber disc with a continuous bead 134 around its outer periphery which in its normal unstressed condition is spaced from wall 106. A central bead 136 on the upper face of disc 132 bears against wall 106. Seal 132 is urged into engagement with end wall 106 by spring 48 and the closed end of a spring retainer tube 51' bearing on its lower face. Three radial slots 138 in bead 136 allow air to flow around bead 134 in its unflexed position as shown in FIG. 6 and out through vent 108. As shown in FIG. 7, when piston 112 is fully extended the upper end of indicator sleeve 50 firmly engages and flexes valve 132 to urge bead 134 into sealing engagement with end wall 106 to prevent air from escaping through vent 108.

Indicator 100 is adapted to be mounted on a wheel rim at a position spaced from a separate conventional valve assembly for inflating and deflating the tire. As the tire is inflated air from within the tire will enter through passage 121 of retainer 122 and passage 126 of lower seal 120 into chamber 128 and act on the lower face of piston 112. If the tire is inflated to a pressure within the predetermined normal range, piston 112 will be partially extended or displaced upward thereby moving indicator line 52 on sleeve 50 so that it can be viewed through slots 54 to indicate by graduations 56 and numerals 58 the pressure of the air within the tire. If the tire is over inflated, piston 112 becomes fully extended and moves the upper end of sleeve 50 into firm engagement with valve 132. This engagement of sleeve 50 flexes valve 132 and urges bead 134 into sealing engagement with end wall 106 to prevent any air passing around piston 112 from escaping through vent 108. Thus when the tire is over inflated valve 132 prevents the tire from being deflated by failure of seal 116 of piston 112.

If the tire becomes under inflated due to the failure of seal 116 or otherwise, piston 112 is urged into firm engagement with lower seal 120 by spring 48. Engagement of piston 112 with seal 120 prevents the tire from becoming further deflated by air escaping through passages 121 and 126, around piston 112 and out of housing 104 through slots 138 and vent 108.

FIGS. 9 and 10 illustrated another form of the indicator designated generally as 140 attached to a conventional valve assembly 141 on a wheel rim or tube (not shown). Valve assembly 141 has a head 139 and a valve core 145 with an actuating stem 147. Indicator 140 has a tubular body 142 with an internal bore 143 and an integral top wall 144 with a vent passage 108 therein. Indicator 140 has a calibrated spring 48, indicator sleeve 50, spring retainer tube 51', indicator line 52, elongated slots 54, graduations 56, numerals 58, lens 60, piston 112 with 0-ring seal 116 and a valve 132 identical to indicator designated 100 in FIGS. 6–8. A lower seal 148 is received in the lower end of bore 143 and retained in a counterbore 150 by an adapter plug 152 threaded in counterbore 150. An 0-ring 154 in a recess 156 in the upper face of plug 152 engages with both seal 148 and counterbore 152 to provide an airtight seal between the plug and counterbore. Lower seal 148 has a hollow extension 158 provided with a port 164 and a central passage 166. Extension 158 extends through a bore 160 in adapter plug 152 and is adapted to engage and displace actuating stem 147 of valve core 145 to allow air within the tire to communicate through port 164 and passage 166 with a variable volume pressure chamber 168 and act on the lower face of piston 112. Adapter plug 152 has a threaded counterbore 170 adapted to mount indicator 140 on head 139 of valve assembly 141. In FIG. 9 indicator 140 is shown only partially threaded on valve assembly 141 in a position where extension 158 has not yet depressed stem 147. An airtight seal between head 139 and counterbore 170 is provided by a rubber washer 172.

When the tire is under inflated or piston 112 fully retracted, the chamfered edge 130 of piston 112 is urged by spring 48 into sealing engagement with the conical surface 173 of lower seal 148 to provide an airtight seal preventing air from passing through passage 166, around piston 112, into static chamber 169 and escaping from housing 142 through vent 108.

When indicator 140 is fully threaded on head 139 extension 158 of lower seal 148 depresses stem 147 (see FIGS. 9 and 10) of valve core 145. Depressing stem 147 opens valve core 145 so that the air within the tire communicates through port 164 and passage 166 with chamber 168 to act on the lower face of piston 112. Indicator 140 functions in the same manner as indicator 100 to indicate the pressure of the air within the tire if it is within the normal range. It functions the same as indicator 100 to seal port 108 by flexing of valve 132 if the tire is over inflated and if under inflated to provide a seal between piston 112 and lower seal 148 to prevent further deflation of the tire.

All of the forms of this pneumatic tire pressure indicator which are illustrated provide an indication of the pressure of the air within the tire if it is within the normal operating range of the device and provide automatic sealing means when the tire is either over or under inflated to prevent further deflation of the tire in the event of failure of the seals of the piston of the indicator. The arrangement shown in FIGS. 1–5 is especially desirable since it enables inflation of the tire without removing the pressure indicator and is usable on a conventional wheel rim. Further modifications of the indicator embodying the basic features disclosed herein will be apparent to persons skilled in this art. For example, the embodiment illustrated in FIGS. 1–5 may be modified in an obvious manner to enable its use on a conventional air stem such as shown at 141 in FIGS. 9 and 10.

We claim:

1. A valve stem for a pneumatic tire which includes pressure indicating means for visibly indicating the pressure in the air chamber of the tire which comprises, an elongate housing adapted to be mounted on a pneumatic tire at its axially inner end and having a wall defining a cylindrical chamber, means forming a plug at the axially inner end of the housing for closing the axially inner end of the chamber and having an inlet passageway extending axially therethrough for establishing communication between the cylindrical chamber and the air chamber of the tire, a hollow valve stem extending axially through said chamber from the axially outer end thereof, the axially outer end of said valve stem having a portion closing the axially outer end of the chamber, the portion of said valve stem extending through said cylindrical chamber having an outer diameter substantially less than the diameter of the chamber and having a valve therein for enabling inflation and deflation of the tire, said valve stem extending axially through said plug to establish communication between the valve in the stem and the air chamber of the tire, sealing means forming an airtight seal between the outer periphery of the plug and the housing wall defining said chamber, a piston axially slideable on said stem within the portion of the chamber between said plug and the axially outer end of said stem, sealing means on piston forming an airtight sliding sealed connection between the piston and the stem and between the piston and the housing wall defining said chamber, said piston dividing said chamber into a static chamber between said piston and the axially outer end portion of the housing and a pressure chamber between said piston and plug, means forming an air vent from said static chamber to atmosphere adjacent the axially outer end of said stem to enable air to escape from said static chamber, a spring inside said static chamber extending between the axially outer end portion of said stem and said piston and urging said piston to seat against said plug, a first sealing means fixed on said plug and adapted to be engaged by the axially inner end of said piston for forming an airtight seal between said stem, piston and plug when when the piston is seated against said plug in response to the bias of said spring, said housing having an axially extending aperture through the wall thereof which is sealed by a transparent member, said piston having a sleeve extension thereon in said static chamber surrounding said spring and projecting towards the axially outer end of the static chamber so that the end of the sleeve is visible through said aperture to indicate the axial position of the piston in the chamber in response to the pressure acting on the axially inner side of the piston from the air chamber of the tire, a second sealing means fixed in the static chamber at the axially outer end of the housing and engageable by the end of the sleeve when the piston is subjected to a predetermined high pressure in said pressure chamber for sealing communication between said vent and the peripheral space in said static chamber between said sleeve and the wall of said static chamber, and a third sealing means fixed on said stem in said static chamber and engageable by the axially outer side of the piston when the end of the sleeve engages the second sealing means to form an airtight seal between the piston and the stem so that, in the event that the sealing means on said piston slideably engaging the chamber forming wall of the housing leak, the tire pressure is maintained in the event of over or under inflation.

2. The combination called for in claim 1 wherein said first sealing means comprises an annular seal of elastic material on said plug engaging said stem and adapted to sealingly abut the piston to prevent air from said inlet passageway from passing between the piston and the stem into said static chamber.

3. The combination called for in claim 2 wherein said first sealing means also includes an annular seal of elastic material on said plug having a conical surface facing said pressure chamber, the face of said piston adjacent said conical surface being inclined at an angle different from said conical surface so as to form an effective seal therewith when the piston engages said conical surface whereby to prevent air from said inlet passageway from passing between the outer periphery of said piston and the wall forming said chamber toward said static chamber.

4. The combination called for in claim 1 wherein said vent communicates with said static chamber radially inwardly of said sleeve extension on the piston.

* * * * *